United States Patent
Oshidari et al.

(10) Patent No.: US 6,890,280 B2
(45) Date of Patent: May 10, 2005

(54) LUBRICATING DEVICE FOR AUTOMATIC POWER TRANSMISSION

(75) Inventors: Toshikazu Oshidari, Kanagawa (JP); Masaki Nakano, Yokohama (JP); Yasuo Takagi, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 63 days.

(21) Appl. No.: 10/654,984

(22) Filed: Sep. 5, 2003

(65) Prior Publication Data

US 2004/0060774 A1 Apr. 1, 2004

(30) Foreign Application Priority Data

Sep. 30, 2002 (JP) ........................................ 2002-285814
Oct. 9, 2002 (JP) ........................................ 2002-296400
Oct. 16, 2002 (JP) ........................................ 2002-302010

(51) Int. Cl.[7] ............................................. F16H 57/04
(52) U.S. Cl. ..................................... 475/159; 184/6.12
(58) Field of Search .......................... 475/159; 184/6.12, 184/6.18

(56) References Cited

U.S. PATENT DOCUMENTS 5,928,100 A * 7/1999 Ohtake et al. .............. 475/159

FOREIGN PATENT DOCUMENTS

JP  7-208586 A  8/1995

* cited by examiner

Primary Examiner—Dirk Wright
(74) Attorney, Agent, or Firm—Foley & Lardner LLP

(57) ABSTRACT

An automatic power transmission to which a lubricating device of the invention is applied is of a type which has an operation mode wherein when, under rotation of an input shaft, a pinion carrier is prevented from making a revolution, pinions carried by the pinion carrier are rotated. The lubricating device comprises a first oil passage formed in a fixed wall of the transmission and connected with an oil supply source; a second oil passage formed in the input shaft, the input shaft being rotatably held by the fixed wall; a third oil passage formed in the pinion carrier to feed the pinions with the lubrication oil, the pinion carrier being concentrically disposed around an axis of the input shaft; a first connection passage connecting the first and second oil passages; and a second connection passage connecting the first and third oil passages. The first connection passage includes a first bore that is formed in the input shaft to lead the oil from the first oil passage to the second oil passage, and a second bore that is formed in the input shaft to lead the oil from the second oil passage to the first oil passage.

13 Claims, 5 Drawing Sheets

LUBRICATING DEVICE FOR AUTOMATIC POWER TRANSMISSION

BACKGROUND OF THE INVENTION

1. Field of the Invention

The present invention relates in general to lubricating devices for an automatic power transmission and more particularly to lubricating devices for a planetary gear unit of an automatic power transmission that has a specified operation mode wherein when revolution of a pinion carrier is stopped under operation of an associated engine, pinions carried by the pinion carrier and a ring gear meshed with the pinions are rotated.

2. Description of the Related Art

Laid-open Japanese Patent Application (Tokkaihei) 07-208586 shows a lubricating device for a planetary gear unit of an automatic power transmission of the above-mentioned type. The automatic power transmission has such a structure that a pinion carrier rotatably held in the transmission holds pinion shafts that hold pinions and a ring gear is meshed with the pinions. In such structure, a sufficient lubrication is needed by the pinions as well as a ring gear bearing rotatably supporting the ring gear in order to avoid undesired seizing of the pinions, the ring gear bearing and their associated parts. The published Application shows a lubricating device that is constructed to feed the pinions, the ring gear bearing and their associated parts with a lubrication oil throughout all speeds with the aid of an oil pumping function of an output member that is constantly rotated except at stopping of an associated engine.

SUMMARY OF THE INVENTION

As is known, when, in the above-mentioned automatic power transmission, drive road wheels of the associated motor vehicle are at a standstill, the pinions are kept stopped. Thus, in such automatic transmission, there is no need of feeding the pinions, the ring gear bearing and their associated parts with a lubrication oil when the drive road wheels are at a standstill.

However, in a so-called hybrid power transmission that is incorporated with both an internal combustion engine and a motor/generator unit, there is an operation mode wherein with the vehicle being at a standstill (viz., the drive road wheels being stopped), the engine is kept operated to drive the motor/generator unit for generating an electric power. In this mode, the planetary gear unit installed in the hybrid power transmission causes the pinions and ring gear thereof to rotate together with their associated sun gear.

Accordingly, in such hybrid power transmission, lubrication of the pinions, the ring gear bearing and their associated parts is needed even when the vehicle is at a standstill. However, when the vehicle is at a standstill with the engine kept operated, output members such as a pinion carrier carrying the pinions, the ring gear and the like are kept stopped and thus an oil pumping function possessed by such output members can not be practically used.

In some of the hybrid power transmissions, for usage of the lubrication oil as a cooling medium for cooling the motor/generator unit, the supply pressure of the lubrication oil is controlled very low to feed a smaller amount of oil actually needed for the cooling to an oil passage of the motor/generator unit. However, if, under such lower pressure supply of oil, the lubrication oil is led from the cooling oil passage of the motor/generator unit to an oil passage of the pinion carrier, it tends to occur that the lubrication oil fails to reach the pinions and ring gear bearing that are positioned above an axis of the pinion carrier. Of course, in this case, sufficient lubrication of the pinions and the ring gear bearing is not carried out.

It is therefore an object of the present invention to provide, for an automatic power transmission having a specified operation mode wherein revolution of a pinion carrier is stopped under operation of an associated engine, pinions carried by the pinion carrier and a ring gear meshed with the pinions are rotated, a lubricating device which can make a satisfied lubrication to the pinions, the ring gear and their associated parts irrespective of rotation/stopping of the output members in the transmission.

According to a first aspect of the present invention, there is provided a lubricating device for a planetary gear unit of an automatic power transmission which has an operation mode wherein when, under rotation of an input shaft, a pinion carrier is prevented from making a revolution, pinions carried by the pinion carrier are rotated. The lubricating device comprises a structure defining a first oil passage, the first oil passage being formed in a fixed wall of the transmission and adapted to be connected with an oil supply source; a structure defining a second oil passage, the second oil passage being formed in the input shaft, the input shaft being rotatably held by the fixed wall; a structure defining a third oil passage, the third oil passage being formed in the pinion carrier to feed the pinions with the lubrication oil, the pinion carrier being concentrically disposed around an axis of the input shaft; a structure defining a first connection passage, the first connection passage connecting the first and second oil passages, the first connection passage including a first bore that is formed in the input shaft to lead the oil from the first oil passage to the second oil passage, and a second bore that is formed in the input shaft to lead the oil from the second oil passage to the first oil passage; and a structure defining a second connection passage, the second connection passage connecting the first and third oil passages.

According to a second aspect of the present invention, there is provided a lubricating device for a planetary gear unit of an automatic power transmission which includes a fixed wall, an input shaft rotatably supported by the fixed wall, a pinion carrier rotatably disposed about an axis of the input shaft, pinion shafts held by the pinion carrier, long pinions rotatably held by first group of the pinions, short pinions rotatably held by second group of the pinions, a first ring gear meshed with the long pinions, a second ring gear meshed with the short pinions, a first annular plate having a radially outer periphery secured to the first ring gear and a radially inner portion placed between the pinion carrier and a circular flange of the input shaft, a first ring gear bearing held by the radially inner portion of the annular plate to bear the pinion carrier and the circular flange, a second annular plate having a radially outer periphery secured to the second ring gear and a radially inner portion, an annular block member fixed to the pinion shafts, and a second ring gear bearing held between the radially inner portion of the second annular plate and the annular block member, the automatic power transmission having an operation mode wherein when, under rotation of the input shaft, the pinion carrier is prevented from making a revolution, the long and short pinions and the first and second ring gears are rotated. The lubricating device comprises a structure defining a first oil passage, the first oil passage being formed in the fixed wall and adapted to be connected with an oil supply source; a structure defining a second oil passage, the second oil passage being formed in the input shaft; a structure defining a third oil passage, the third oil passage being formed in the pinion carrier to feed the long and short pinions with the lubrication oil; a structure defining a first connecting passage, the first connection passage connecting the first and second oil passages, the first connection passage including a first bore that is formed in the input shaft to lead the oil from the first oil passage to the second oil passage, and a second bore that is formed in the input shaft to lead the oil from the second oil passage to the first oil passage; and a structure defining a second connecting passage, the second connecting passage connecting the first and third oil passages.

DETAILED DESCRIPTION OF THE INVENTION

Figure 1:
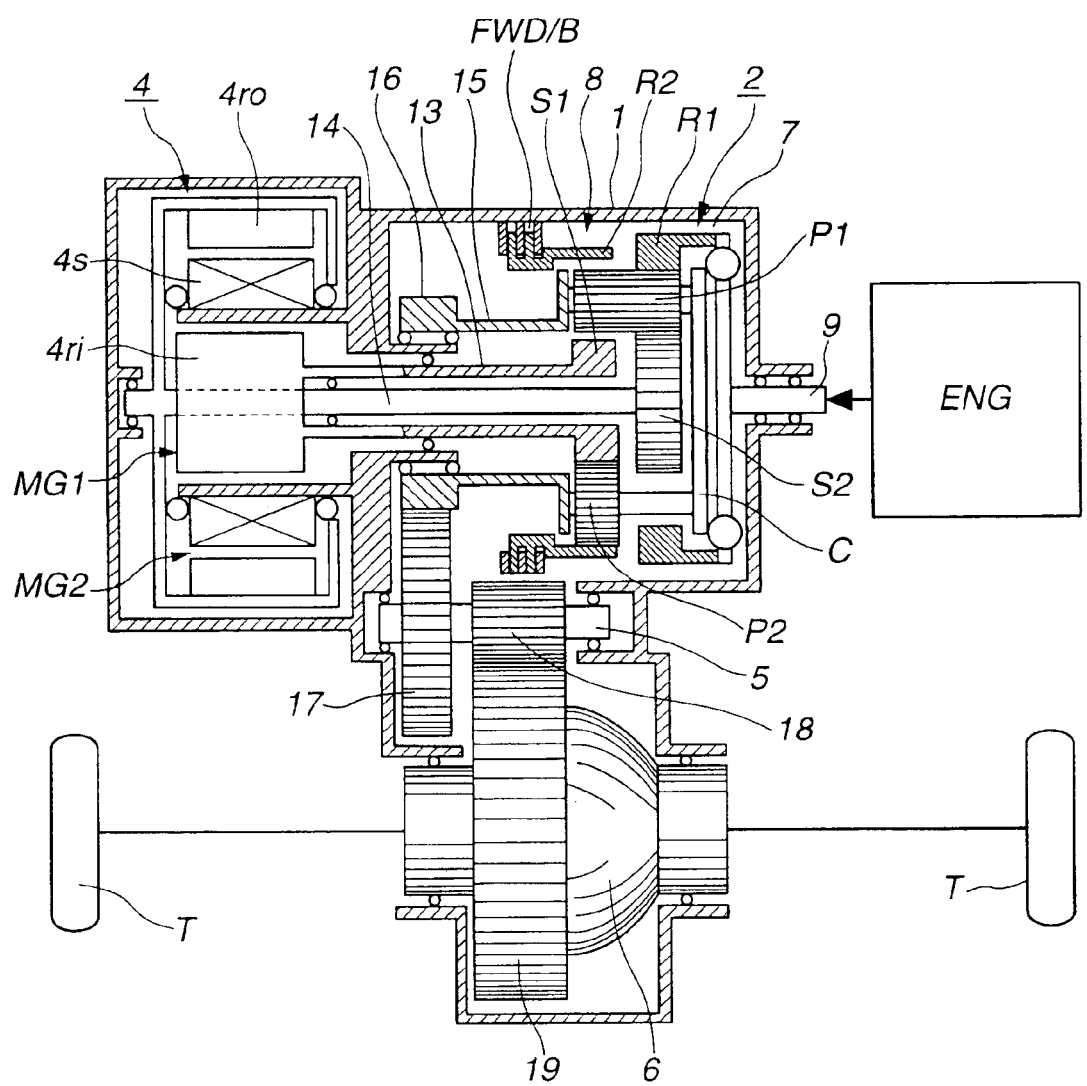
FIG. 1 is a schematic view of a hybrid power transmission to which a lubricating device of the present invention is practically applied.

In the following, an embodiment of the present invention will be described in detail with reference to the accompanying drawings.

For easy understanding, various directional terms, such as, right, left, upper, lower, rightward and the like are used in the following description. However, such terms are to be understood with respect to only the drawing or drawings on which a corresponding part or element is shown.

In FIG. 1, there is schematically shown a hybrid power transmission to which a lubricating device of the present invention is practically applied. The hybrid power transmission shown is employed in a transaxle for a FF (viz., front engine and front drive) type motor vehicle.

In FIG. 1, there is shown a transmission case 1. In an axially right space of transmission case 1, viz., the space near an engine ENG, there is installed a ravigneawx type planetary gear unit 2, and in an axially left space of transmission case 1, there is installed a motor/generator unit 4 that constitutes a so-called combined current double layer winding motor 4.

As is seen from FIG. 1, in transmission case 1, ravigneawx type planetary gear unit 2 and combined current double layer winding motor 4 are coaxially arranged on an imaginary common axis. A counter shaft 5 is arranged in parallel with the imaginary common axis, as shown. A differential gear device 6 is installed in an projected part of transmission case 1.

Ravigneawx type planetary gear unit 2 comprises a single pinion planetary gear unit 7 and a double pinion planetary gear unit 8 which have long pinions P1 in common.

Single pinion planetary gear unit 7 comprises a sun gear S2, a ring gear R1 and the long pinions P1 each meshed with both sun gear S2 and ring gear R1.

Double pinion planetary gear unit 8 comprises a sun gear Si, a ring gear R2, the long pinions P1 each being meshed with both sun gear S1 and ring gear R2, and diametrically larger short pinions P2 each being meshed with sun gear S1, long pinions P1 and ring gear R2.

In the illustrated ravigneawx planetary gear unit 2, three long pinions P1 and three short pinions P2 are employed. That is, six pinions P1 and P2 are employed in total.

All of pinions P1 and P2 are rotatably carried by a common pinion carrier C.

A forward brake FRD/B of a multi-disc type is arranged near ring gear R2 and brakes and holds the same when actuated or engaged. That is, when an associated motor vehicle runs forward, forward brake FRD/B assumes its engaged condition, while the vehicle runs backward, the brake FRD/B assumes its disengaged condition.

Ravigneawx type planetary gear unit 2 has further sun gears S1 and S2, ring gears R1 and R2 and pinion carrier C, which are all rotatable parts, as main elements. Thus, the planetary gear unit 2 constitutes a so-called a differential gear system with two degrees of freedom that, upon determining a rotation speed of two of the five main elements, automatically determines the rotation speed of the remaining three of the main elements. The main elements show their rotation speed reduced in order of sun gear S1, ring gear R1, pinion carrier C, ring gear R2 and sun gear S2.

Combined current double layer winding motor 4 comprises an inner rotor 4ri and an annular outer rotor 4ro surrounding inner rotor 4ri, which are coupled to rotate about a common axis in transmission case 1. In a cylindrical space defined between inner and outer rotors 4ri and 4ro, there is installed an annular stator 4s which is concentric with the common axis and fixed to transmission case 1.

Annular stator 4s and inner rotor 4ri constitute an inner or first motor/generator unit MG1 and annular stator 4s and outer rotor 4ro constitute an outer or second motor/generator unit MG2.

When first and second motor/generator units MG1 and MG2 are fed with a combined current, each unit MG1 or MG2 serves as a motor that produces a torque turning an output member thereof in a direction and at a speed according to the fed current. The speed includes 0 (zero). While, when first and second motor/generator units MG1 and MG2 are not fed with the combined current, each unit MG1 or MG2 serves as a generator that generates an electric power in accordance with an external force applied thereto.

Sun gear S1, ring gear R1, pinion carrier C, ring gear R2 and sun gear S2 of ravigneawx type planetary gear unit 2 are respectively connected to first motor/generator unit MG1, an engine ENG, a road wheel driving section including differential gear device 6, forward brake FRD/B and second motor/generator unit MG2. The engine ENG may be an internal combustion engine.

More specifically, as is clearly shown in FIG. 1, in order to permit ring gear R1 to serve as an input element to which the engine rotation is applied, ring gear R1 is connected to an engine crankshaft 9 through a clutch CL. It is to be noted that clutch CL functions to selectively establish and cancel (or, engage and disengage) the connection between ring gear R1 and engine crankshaft 9. Due to this engage/disengage operation of clutch CL, undesired engine torque drag phenomenon can be avoided at the time when, with engine ENG kept stopped, the associated hybrid motor vehicle runs by only the power of motor 4.

Sun gear S1 is connected to inner rotor 4ri of first motor/generator unit MG1 through a hollow shaft 13, and the other sun gear S2 connected to outer rotor 4ro of second motor/generator unit MG2 through a shaft 14 that passes through first motor/generator unit MG1 and hollow shaft 13.

In order to permit pinion carrier C to serve as an output element from which a rotation is outputted to the road wheel driving section, pinion carrier C is connected to an output gear 16 through a hollow shaft 15, and output gear 16 is meshed with a counter gear 17 disposed on counter shaft 5.

A final drive pinion 18 is integrally disposed on counter shaft 5 and meshed with a final drive ring gear 19 of differential gear device 6. Final drive pinion 18 and final drive ring gear 19 constitute a final drive gear unit. From differential gear device 6, there extend two drive shafts each having a road wheel T connected thereto.

The output rotation from the hybrid power transmission is transmitted to differential gear device 6 through the final drive gear unit (viz., final drive pinion 18 and final drive ring gear 19) and distributed to the two road wheels T by differential gear device 6.

As is described hereinabove, in a hybrid motor vehicle equipped with the above-mentioned hybrid power transmission, there is an operation mode wherein with the vehicle being at a standstill (viz., drive road wheels T being kept stopped), the engine is kept operated for the purpose of driving first and second motor/generator units MG1 and MG2 to generate an electric power. Under this operation mode, pinion carrier C connected to the drive road wheels T through many gears is stopped, but long and short pinions P1 and P2 carried by pinion carrier C and ring gear R2 meshed with pinions P2 are rotated along with rotation of sun gears S1 and S2 and ring gear R1.

Of course, in this operation mode, it is necessary to sufficiently feed the long and short pinions P1 and P2 and a ring gear bearing of ring gear R2 meshed with pinions P2 with a lubrication oil.

In the present invention, the following measures are employed in the above-mentioned hybrid power transmission for lubrication of pinions P1 and P2 and the ring gear bearing of ring gear R2 meshed with pinions P2.

Figure 2:
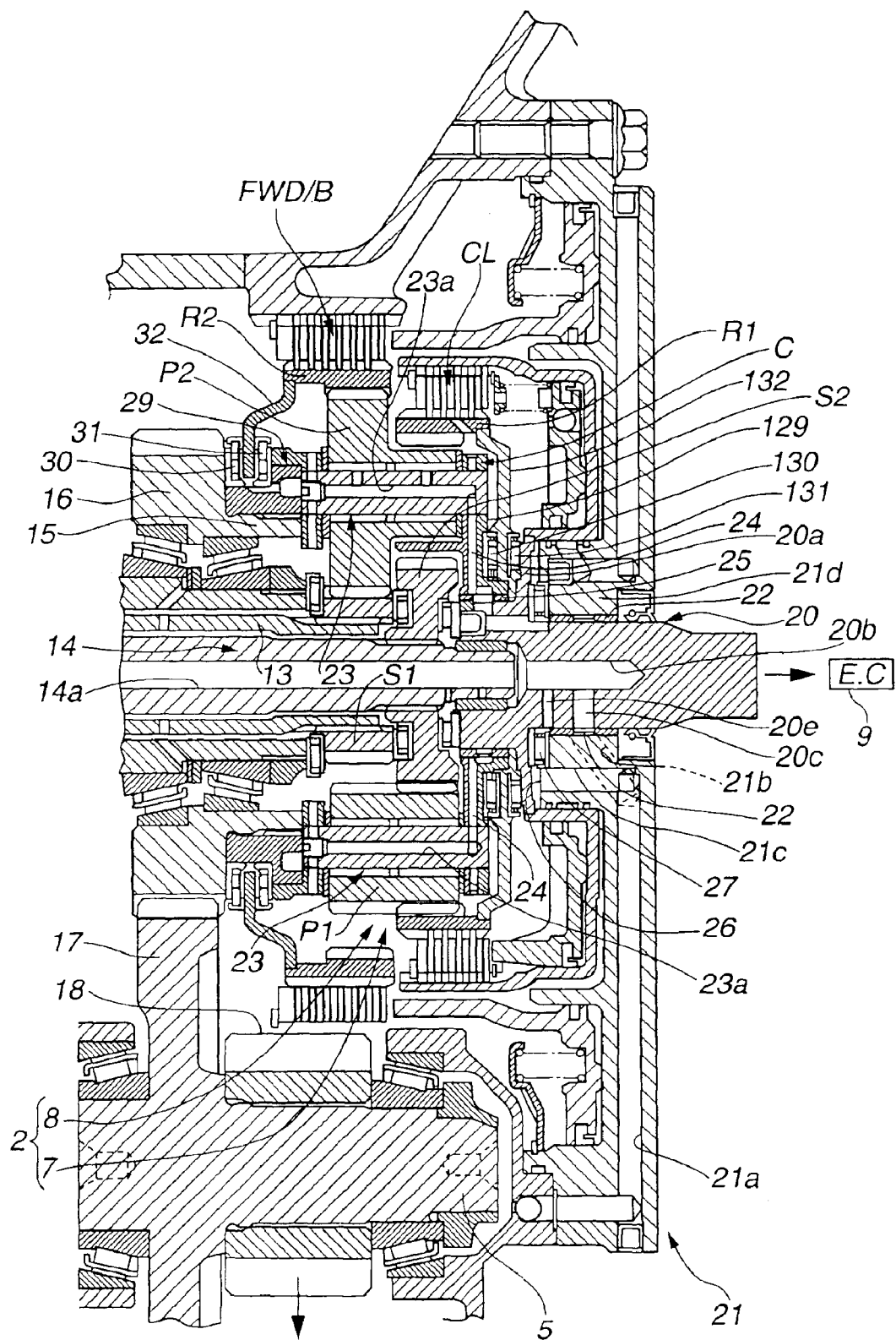
FIG. 2 is an enlarged sectional view of a part of the hybrid power transmission, where the lubricating device of the present invention is provided.
Figure 3:
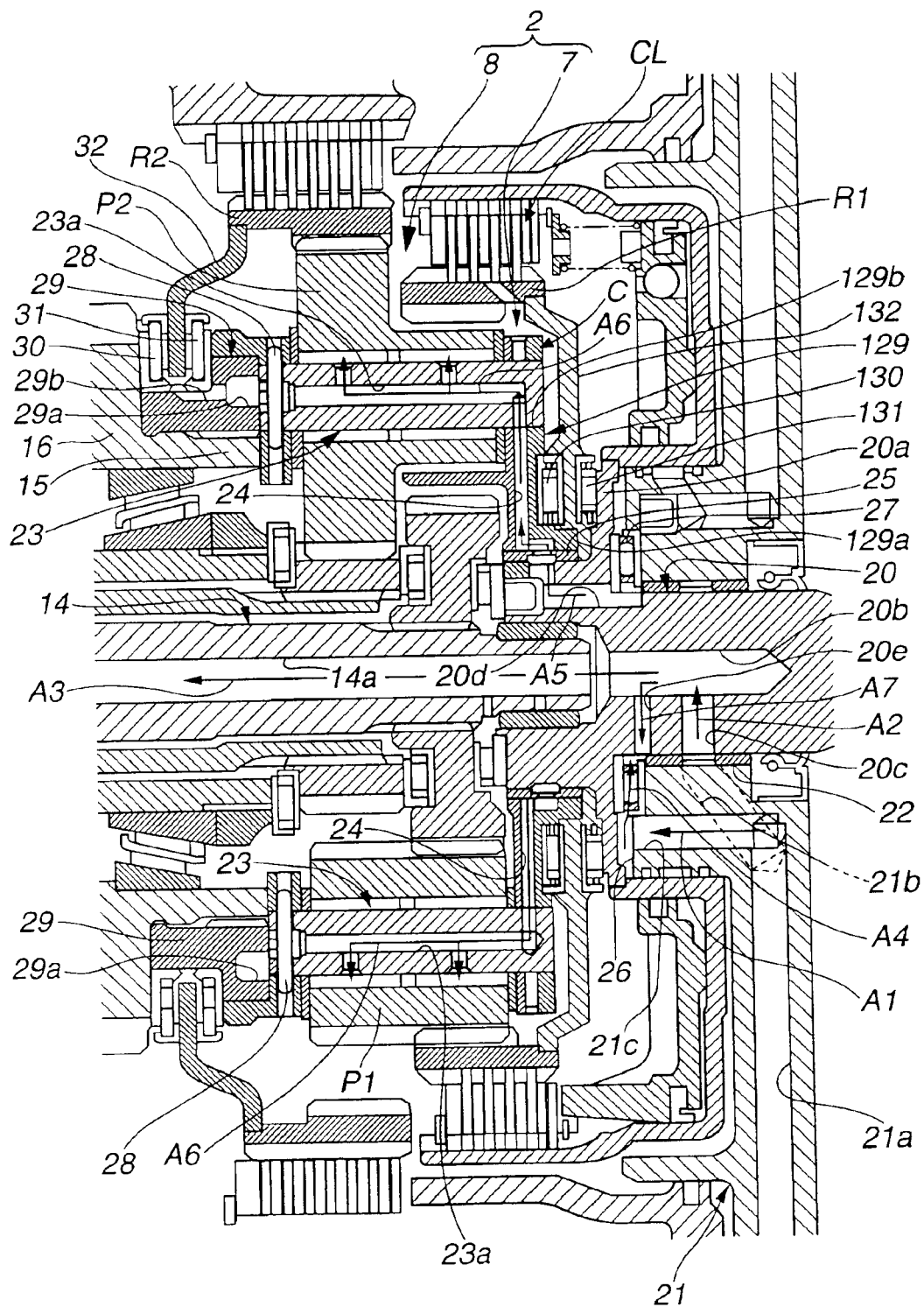
FIG. 3 is an enlarged sectional view of an essential part of the lubricating device of the present invention.

Referring to FIGS. 2 and 3, there are shown sectional views of a part of the hybrid power transmission, where a lubricating device of the present invention is provided. FIG. 3 is an enlarged view of the part.

As is best seen in FIG. 2, between shaft 14 and engine crankshaft 9, there is disposed an input shaft 20 of which right end is connected to engine crankshaft 9 and left end is connected to shaft 14. Thus, under operation of the engine, input shaft 20 is rotated about its axis.

Furthermore, as will be described in detail hereinafter, a needle (or thrust) bearing 27 is connected to a radially inward part of a fixed wall 21 for the purpose of bearing a thrust force exerted on input shaft 20. This arrangement aims to bring about a compact construction of the power transmission.

The lubricating device of the present invention comprises, as is seen from FIGS. 2 and 3, an upstream lubrication oil passage 21a formed in fixed wall 12 that is fixed to transmission case 1. Although not shown in the drawings, the oil passage 21a is connected with an oil supply pump, so that under operation of the pump, lubrication oil is forced flow in the passage 21a in a radially inward direction, that is, toward a cylindrical bored bearing portion 21d formed on the inner surface of fixed wall 21.

As is best shown in FIG. 3, from the radially inward end of the oil passage 21a, there extend a first branch passage 21b that diagonally extends in the bored bearing portion 21d to reach a cylindrical inner surface of the bored bearing portion 21d and a second branch passage 21c that axially extends in the bored bearing portion 21d to reach an axially inside end surface of the bored bearing portion 21d.

As is shown in FIG. 3, input shaft 20 is formed at its left end with a circular flange 20a whose right end surface faces the axially inside end surface of bored bearing portion 21d of fixed wall 21. That is, circular flange 20a is positioned more inside of the transmission than bored bearing portion 21d of fixed wall 21. Input shaft 20 is formed with an axially extending passage 20b which is communicated with an axially extending passage 14a formed in shaft 14. As will be understood from FIG. 1, the lubrication oil flowing in passages 20b and 14a is applied to first and second motor/generator units MG1 and MG2 and surrounding elements to lubricate and cool the same.

Referring back to FIG. 3, input shaft 20 is formed with a first radial bore 20c through which first branch passage 21b of fixed wall 21 and axially extending passage 20b of input shaft 20 are connectable. For a hermetical seating between the cylindrical outer surface of input shaft 20 and the cylindrical inner surface of the bored bearing portion 21d of fixed wall 21, there is interposed a bush 22 therebetween.

Input shaft 20 is further formed with a carrier connection passage 20d and a second radial bore 20e. Carrier connection passage 20d is formed in a cylindrical outer surface of input shaft 20 and arranged to lead the lubrication oil from needle bearing 27 to pinion carrier C. Needle bearing 27 is installed in a space 26 that is defined between circular flange 20a of input shaft 20 and bored bearing portion 21d of fixed wall 21.

As is seen from FIG. 3, second radial bore 20e extends from axially extending passage 20b to a leading end of bored bearing portion 21d of fixed wall 21, where an inner race of needle bearing 27 is placed. That is, due to presence of second radial bore 20e, passage 20b of input shaft 20 and space 26 can be communicated.

The cross sectional area of second radial bore 20e is smaller than that of first radial bore 20c, so that flow resistance of second radial bore 20e is larger than that of first radial bore 20c.

Pinion carrier C of ravigneawx type planetary gear unit 2 is formed with radially extending oil passages 24 that lead to pinion lubrication oil passages 23a formed in pinion shafts 23. Through these oil passages 24 and 23a, the lubrication oil is supplied to roller bearings that rotatably support long and short pinions P1 and P2 and then to these pinions P1 and P2. As will be described hereinafter, each pinion shaft 23 is connected to pinion carrier C through a pin 28.

It is to be noted that the fluid communication between carrier connection passage 20d of input shaft 20 and radially extending oil passage 24 of pinion carrier C is made through a bush 25 that has been press-fitted into pinion carrier C. The connection between radially extending oil passage 24 and bush 25 will be described in detail hereinafter.

As has been mentioned hereinabove, in the space 26 defined between circular flange 20a of input shaft 20 and the inwardly projected end of bored bearing portion 21d of fixed wall 21, there is installed needle bearing 27 for bearing a rightward thrust force of input shaft 20. A peripheral end of space 26 is sealed by a seal (no numeral) that is used in an oil passage formed in input shaft 20 for a clutch CL. If desired, in replace of the above-mentioned needle bearing 27, other type bearings may be used in the present invention so long as they can bear the thrust force of input shaft 20.

When, as is seen from FIG. 2, input shaft 20 is rotated at a lower speed, the following oil flow is carried out for lubricating long and short pinions P1 and P2.

That is, under such low speed rotation of input shaft 20, lubrication oil that has been led into upstream lubrication oil passage 21a is led into second and first branch passages 21c and 21b as is indicated by arrows A1 and A2.

The lubrication oil led into first branch passage 21b as indicated by arrow A2 is led into axially extending passage 20b of input shaft 20 through first radial bore 20c of the same. Then, as is indicated by arrow A3, the lubrication oil is led to the passage 14a of shaft 14 and then to first and second motor/generator units MG1 and MG2 and surrounding parts (see FIG. 1) to cool and lubricate the same. Although not shown in the drawings, the lubrication oil that has lubricated and cooled these parts is led to an oil passage provided outside of shaft 14 for lubricating and cooling other parts.

While, the lubrication oil led to second branch passage 21c is led through the space 26 into carrier connection passage 20d and second radial bore 20e. As is indicated by arrow A4, flowing of the lubrication oil from space 26 to carrier connection passage 20d is so made that the lubrication oil flows from an outside of needle bearing 27 toward an inside of the same and then flows into carrier connection passage 20d. As is indicated by arrow A5, the lubrication oil led to this carrier connection passage 20d is led to radially extending oil passages 24 of pinion carrier C through bush 25 and, as is indicated by arrow A6, led to the roller bearings for long and short pinions P1 and P2 through pinion lubrication oil passages 23a of pinion shafts 23 and to the pinions P1 and P2. The lubrication oil led to second radial bore 20e is led into axially extending passage 20b of input shaft 20 and then to first and second motor/generator units MG1 and MG2 and surrounding parts in such a manner as has been mentioned hereinabove.

As is described hereinabove, when input shaft 20 is rotated at a lower speed, the main flow of the lubrication oil from upstream lubrication oil passage 21a toward long and short pinions P1 and P2 is made through second branch passage 21c, the space 26, carrier connection passage 20d, radially extending oil passage 24. This lubrication oil flow is caused by the presence of bush 22 which shows a marked resistance against an oil flow that flows into axially extending passage 20b of input shaft 20 from first radial bore 20c of the same. That is, under such lower speed rotation, with an oil supplying pressure that is higher than that in the passage 20b, the lubrication oil is transported to the oil passages 24 of pinion carrier C and thus long and short pinions P1 and P2 can be sufficiently lubricated by the oil.

While, when input shaft 20 is rotated at a higher speed, the following oil flow is carried out for lubricating long and short pinions P1 and P2.

That is, under such high speed rotation of input shaft 20, the lubrication oil that has been led into axially extending passage 20b of input shaft 20 from upstream lubrication oil passage 21a through first branch passage 21b is forced to flow into second radial bore 20e due to a certain centrifugal force applied to the oil. It is to be noted that under such high speed rotation of input shaft 20, due to the centrifugal force applied to the lubrication oil in space 26, smoothed flow of the oil from second branch passage 21c to the space 26 is obstructed. It is further to be noted that in the above-mentioned lower speed case of input shaft 20, a sufficient centrifugal force is not produced and thus oil flow from the passage 20b to second radial bore 20e is not smoothly carried out.

As is described hereinabove, when input shaft 20 is rotated at a higher speed, the main flow of the lubrication oil toward the roller bearings of the long and short pinions P1 and P2 is made through axially extending passage 20b of input shaft 20, second radial bore 20e (see arrow A7), a radially inner portion of needle bearing 27, carrier connection passage 20d and radially extending oil passages 24 of pinion carrier C. With this oil flow, long and short pinions P1 and P2 are sufficiently lubricated under high speed rotation of input shaft 20.

Furthermore, in the lubricating device of the invention, as is shown in FIG. 3, an annular block member 29 is fixed to pinion carrier C in a manner to cover leading ends of pinion shafts 23. Tightly disposed on a diametrically reduced portion of annular block member 29 are first and second needle bearings 30 and 31 which serve as a ring gear bearing for ring gear R2. As shown, first and second needle bearings 30 and 31 have inner races that are secured to an annular ring of which outer edge is secured to ring gear R2. Thus, the ring gear bearing (viz., the unit consisting of first and second needle bearings 30 and 31) disposed on annular block member 29 rotatably supports ring gear R2 while holding a thrust force exerted on ring gear R2. Annular block member 29 is formed with an annular groove 29a and a plurality of small bores 29b through which the lubrication oil is led to first and second needle bearings 30 and 31 from lubrication oil passages 23a of pinion shafts 23. That is, under operation, the lubrication oil is temporarily stored in annular groove 29a to be measured and then led to the needle bearings 30 and 31 through small bores 29b.

Annular block member 29 is formed on a cylindrical inner surface thereof with splines which are operatively engaged with hollow shaft 15 integrally connected to output gear 16.

As is seen from FIG. 3, annular block member 29 is tightly fitted in an annular step of pinion carrier C. Pins 28 are used for connecting pinion carrier C and pinion shafts 23.

As is described hereinabove, in the lubrication device of the present invention, lubrication oil is applied to long and short pinions P1 and P2 through passages 24 of pinion carrier C, and there are provided upstream lubrication oil passage 21a, second branch passage 21c and carrier connection passage 20d through which the lubrication oil is led to passages 24 under rotation of input shaft 20. Furthermore, between circular flange 20a of input shaft 20 and bored bearing portion 21d of fixed wall 21, there is defined a space 26 through which the lubrication oil is transported from fixed wall 21 to input shaft 20.

As will be understood from the foregoing description, the lubrication oil in upstream lubrication oil passage 21a, which has a sufficiently high pressure, can be led to passages 24 of pinion carrier C through second branch passage 21c of fixed wall 21. This oil supply way is much effective as compared with the other oil supply way in which axially extending passage 20b and first and second radial bores 20c and 20e are used for transporting the oil to passages 24. That is, long and short pinions P1 and P2 and first and second needle bearings 30 and 31 (which constitute the ring gear bearing) can be sufficiently lubricated without the aid of oil pumping function of output rotation members that are located near the pinions P1 and P2. That is, the lubrication oil in passages 24 is applied to long and short pinions P1 and P2 through oil passages 23a and radial passages formed in pinion shafts 23, and the lubrication oil in passages 24 is also applied to first and second needle bearings 30 and 31 through annular groove 29a and small bores 29b of annular block member 29.

Accordingly, in the present invention, a sufficient lubrication of pinions P1 and P2 and first and second needle bearings 30 and 31 is achieved even at the time when the pinion carrier C of the hybrid power transmission is stopped due to a standstill of an associated motor vehicle with an engine kept operated.

Because annular block member 29 is a separate member that is to be fixed to pinion carrier C, formation of the splines on the cylindrical inner surface as well as annular groove 29a and small bores 29b is easily made. Furthermore, since annular block member 29 is tightly fitted in the annular step of pinion carrier C and the leading ends of pinion shafts 23 are held by pinion carrier C through pins 28, an assured connection is achieved in the parts.

Figure 4:
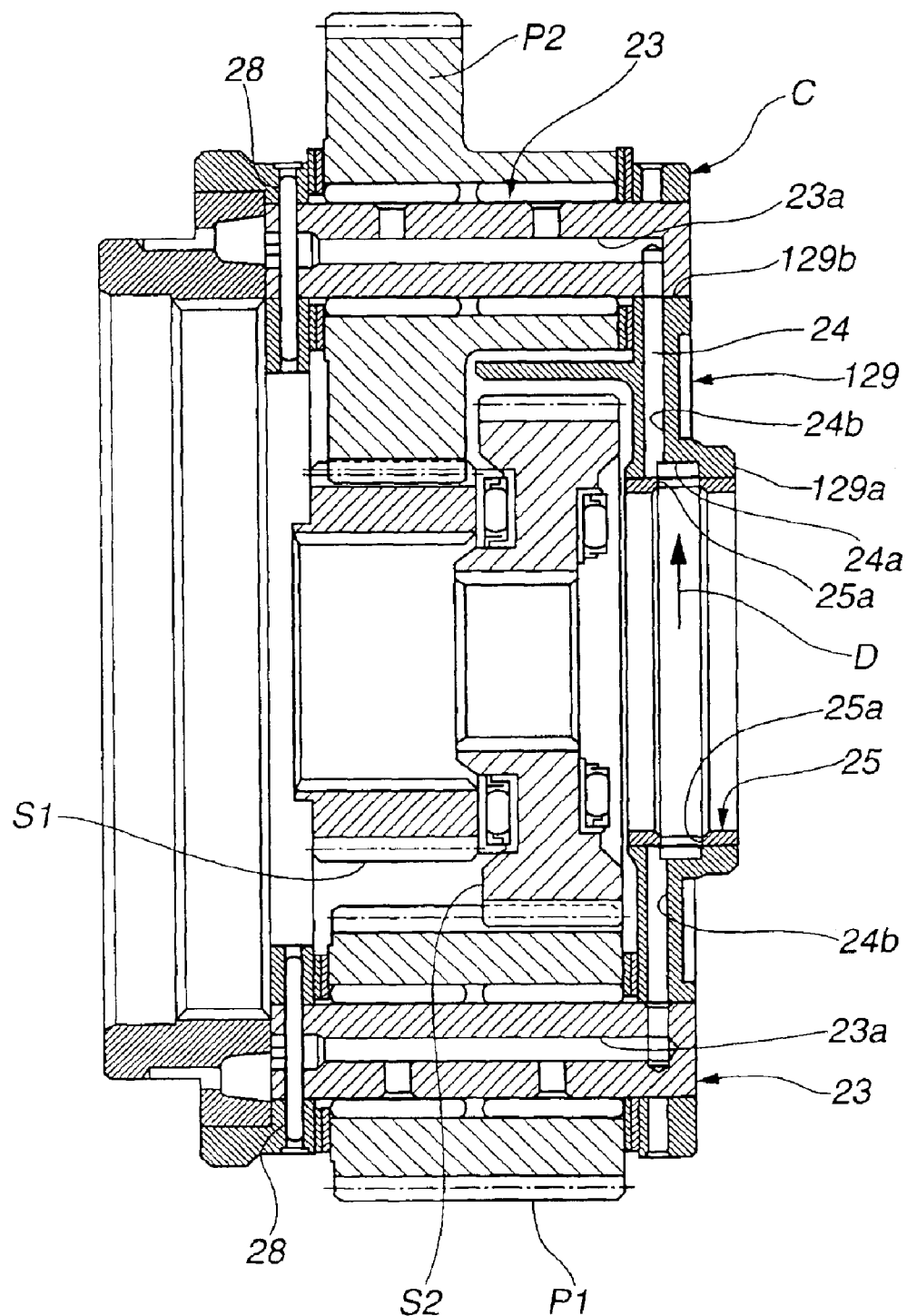
FIG. 4 is an enlarged sectional view of a part of the lubricating device where a pinion carrier and associated parts are arranged.
Figure 5:
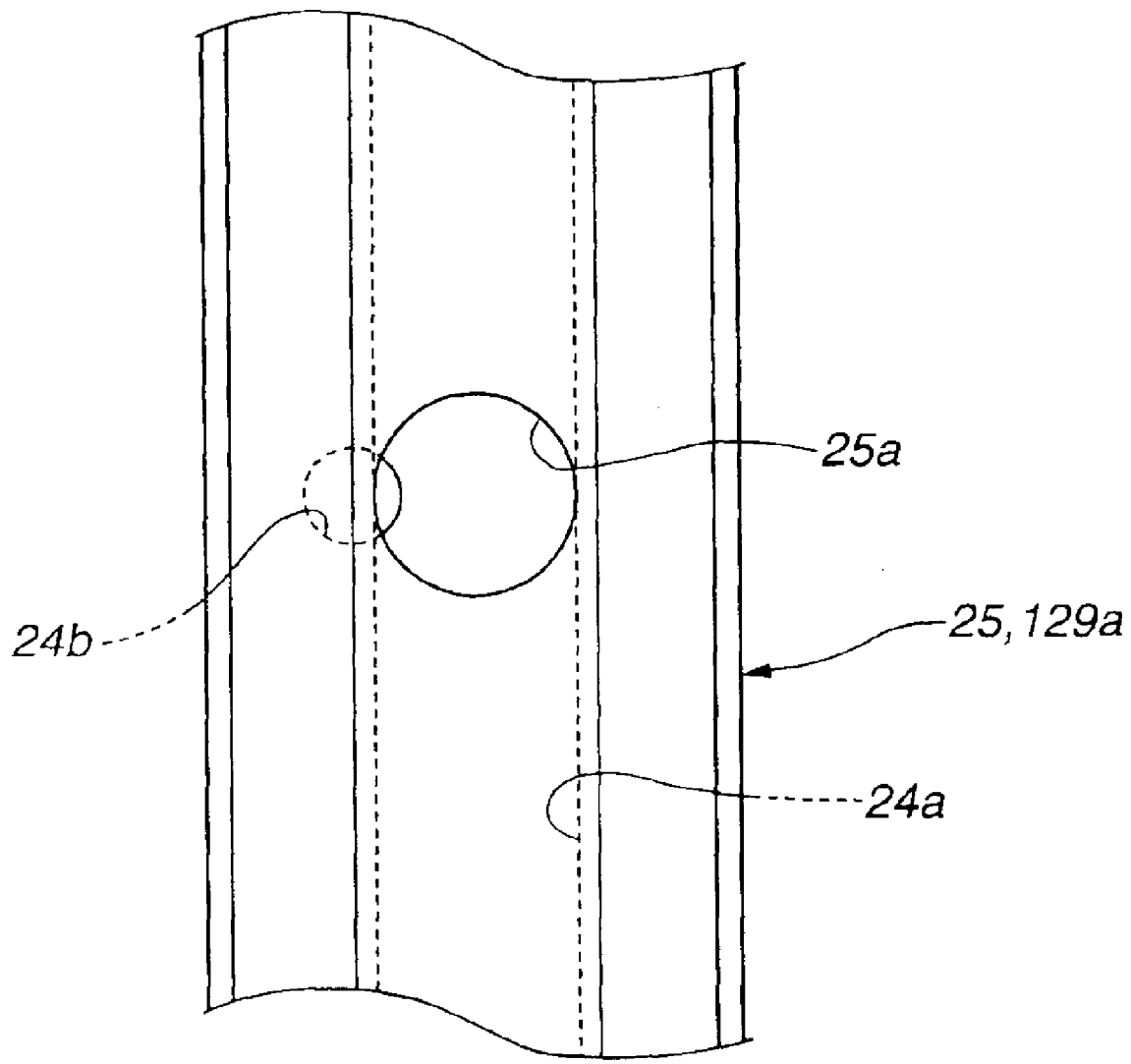
FIG. 5 is an enlarged view taken from the direction of arrow "D" of FIG. 4.

The present invention will be much clarified from the following description that is directed to FIGS. 4 and 5.

That is, FIG. 4 is an enlarged sectional view of a part of the lubricating device where pinion carrier C and its associated parts are arranged, and FIG. 5 is an enlarged view taken from the direction of arrow "D" of FIG. 4.

As is seen from FIG. 4, pinion carrier C comprises a circular supporting member 129 which holds pinion shafts 23. As shown, within circular supporting member 129, there are defined the above-mentioned radially extending oil passages 24. Circular supporting member 129 has at its center portion a bored boss portion 129a through which input shaft 20 (see FIG. 3) passes through the above-mentioned bush 25. Circular supporting member 129 has further at its peripheral portion six equally spaced circular openings 129b that tightly hold right ends of pinion shafts 23.

As shown in FIG. 4, within bored boss portion 129a, there is received bush 25, and as is seen from FIG. 3, within bush 25, there extends input shaft 20.

As is seen from FIG. 3, upon assembly, a right surface of circular supporting member 129 faces a left surface of the above-mentioned circular flange 20a of input shaft 20 leaving a given space therebetween. An annular plate 132 is arranged, which has a radially outer peripheral portion secured to ring gear R1 and a radially inner portion located in the given space between circular supporting member 129 and circular flange 20a.

Between circular supporting member 129 and annular plate 132, there is operatively disposed a first needle bearing 130, and between annular plate 132 and circular flange 20a, there is operatively disposed a second needle bearing 131. Due to provision of circular supporting member 129, ring gear R1 is positioned in an axial direction, and due to provision of first and second needle bearings 130 and 131, annular plate 132 is rotatably held and axially supported.

Referring back to FIG. 4, the cylindrical inner surface of bored boss portion 129a is formed with an annular groove 24a which serves as an oil flow passage. From annular groove 24a, there radially outwardly extend six oil passages 24b which constitute the above-mentioned radially extending oil passages 24. As shown, each oil passage 24b extends to pinion lubrication oil passage 23a formed in the corresponding pinion shaft 23.

As is seen from FIG. 4, bush 25 has an axial length that is equal to the length of the cylindrical bore of bored boss portion 129a, and bush 25 is press-fitted in the cylindrical bore of bored boss portion 129a.

As is seen from FIGS. 4 and 5, bush 25 is formed at its middle portion with equally spaced six circular openings 25a through which the interior of bush 25 is communicated with annular groove 24a of bored boss portion 129a. As is seen from FIG. 5, each of radially outwardly extending oil passages 24b has a base portion partially covered by bush 25.

During lubrication oil flow from carrier connection passage 20d toward radially extending oil passages 24, a small amount of oil inevitably leaks from the mating area between bush 25 and input shaft 20 and is led to first and second needle bearings 130 and 131 to lubricate the same.

As is described hereinabove, circular supporting member 129 of pinion carrier C, annular plate 132, first and second needle bearings 130 and 131 and circular flange 20a of input shaft 20 are compactly assembled and thus the planetary gear unit has a reduced axial length, which induces a compactness of the hybrid power transmission.

Because of the constructional feature of annular plate 132, it can function as a positioning means for ring gear R1. Thus, undesirable axial displacement of ring gear R1, which would occur under torque transmission, is assuredly suppressed. Ring gear R1 and input shaft 20 are connected through clutch CL. That is, under engagement of clutch CL, there is produced no relative rotation between annular plate 132 and circular flange 20a of input shaft 20. Furthermore, when the vehicle runs forward, there is produced no relative rotation between annular plate 132 and pinion carrier C. In such cases, no work is needed by second and first needle bearings 131 and 130, which increases the life of these bearings 131 and 130.

The entire contents of Japanese Patent Applications 2002-285814 (filed Sep. 30, 2002), 2002-296400 (filed Oct. 9, 2002) and 2002-302010 (filed Oct. 16, 2002) are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A lubricating device for a planetary gear unit of an automatic power transmission which has an operation mode wherein when, under rotation of an input shaft, a pinion carrier is prevented from making a revolution, pinions carried by the pinion carrier are rotated, the lubricating device comprising:
a structure defining a first oil passage, the first oil passage being formed in a fixed wall of the transmission and adapted to be connected with an oil supply source;
a structure defining a second oil passage, the second oil passage being formed in the input shaft, the input shaft being rotatably held by the fixed wall;
a structure defining a third oil passage, the third oil passage being formed in the pinion carrier to feed the pinions with the lubrication oil, the pinion carrier being concentrically disposed around an axis of the input shaft;
a structure defining a first connection passage, the first connection passage connecting the first and second oil passages, the first connection passage including a first bore that is formed in the input shaft to lead the oil from the first oil passage to the second oil passage, and a second bore that is formed in the input shaft to lead the oil from the second oil passage to the first oil passage; and
a structure defining a second connection passage, the second connection passage connecting the first and third oil passages.

2. A lubricating device as claimed in claim 1, in which a sectional area of the second bore is smaller than that of the first bore.

3. A lubricating device as claimed in claim 1, in which the first oil passage comprises:
   an upstream oil passage;
   a first branch passage that connects a downstream part of the upstream oil passage to the first bore; and
   a second branch passage that connects the downstream part of the upstream oil passage to the second bore.

4. A lubricating device as claimed in claim 3, in which the second branch passage and the second bore are connected through a given space in which a thrust bearing is installed, the thrust bearing being interposed between the fixed wall and the input shaft to bear a thrust force exerted on the input shaft.

5. A lubricating device as claimed in claim 4, in which the second connection passage comprises:
   a carrier connection passage formed in a cylindrical outer surface of the input shaft and connected to the given space; and
   openings formed in a bush that is disposed between a cylindrical outer surface of the input shaft and a cylindrical inner surface of a center circular bore formed in the pinion carrier.

6. A lubricating device for a planetary gear unit of an automatic power transmission which includes a fixed wall, an input shaft rotatably supported by the fixed wall, a pinion carrier rotatably disposed about an axis of the input shaft, pinion shafts held by the pinion carrier, long pinions rotatably held by first group of the pinions, short pinions rotatably held by second group of the pinions, a first ring gear meshed with the long pinions, a second ring gear meshed with the short pinions, a first annular plate having a radially outer periphery secured to the first ring gear and a radially inner portion placed between the pinion carrier and a circular flange of the input shaft, a first ring gear bearing held by the radially inner portion of the annular plate to bear the pinion carrier and the circular flange, a second annular plate having a radially outer periphery secured to the second ring gear and a radially inner portion, an annular block member fixed to the pinion shafts, and a second ring gear bearing held between the radially inner portion of the second annular plate and the annular block member, the automatic power transmission having an operation mode wherein when, under rotation of the input shaft, the pinion carrier is prevented from making a revolution, the long and short pinions and the first and second ring gears are rotated,
   the lubricating device comprising:
      a structure defining a first oil passage, the first oil passage being formed in the fixed wall and adapted to be connected with an oil supply source;
      a structure defining a second oil passage, the second oil passage being formed in the input shaft;
      a structure defining a third oil passage, the third oil passage being formed in the pinion carrier to feed the long and short pinions with the lubrication oil;
      a structure defining a first connecting passage, the first connection passage connecting the first and second oil passages, the first connection passage including a first bore that is formed in the input shaft to lead the oil from the first oil passage to the second oil passage, and a second bore that is formed in the input shaft to lead the oil from the second oil passage to the first oil passage; and
      a structure defining a second connecting passage, the second connecting passage connecting the first and third oil passages.

7. A lubricating device as claimed in claim 6, in which a sectional area of the second bore is smaller than that of the first bore.

8. A lubricating device as claimed in claim 6, in which the first oil passage comprises:
   an upstream oil passage;
   a first branch passage that connects a downstream part of the upstream oil passage to the first bore; and
   a second branch passage that connects the downstream part of the upstream oil passage to the second bore.

9. A lubricating device as claimed in claim 8, in which the second branch passage and the second bore are connected through a given space in which a thrust bearing is installed, the thrust bearing being interposed between the fixed wall and the input shaft to bear a thrust force exerted on the input shaft.

10. A lubricating device as claimed in claim 9, in which the second connection passage comprises:
    a carrier connection passage formed in a cylindrical outer surface of the input shaft and connected to the given space; and
    openings formed in a bush that is disposed between a cylindrical outer surface of the input shaft and a cylindrical inner surface of a center circular bore formed in the pinion carrier.

11. A lubricating device as claimed in claim 6, further comprising a structure defining a fourth oil passage that extends from the second connecting passage to the first ring gear bearing to feed the same with the lubrication oil.

12. A lubricating device as claimed in claim 6, further comprising a structure defining a fifth oil passage that extends from the third oil passage to the second ring gear bearing to feed the same with the lubrication oil.

13. A lubricating device as claimed in claim 12, in which the fifth oil passage comprises:
    an annular groove formed in the annular block member and connected with the third oil passage; and
    a plurality of bores formed in the annular block member, each bore extending from the annular groove to the second ring gear bearing.

* * * * *